United States Patent [19]

Kudo et al.

[11] 4,164,157

[45] Aug. 14, 1979

[54] DEVICE FOR ADJUSTING IGNITION TIMING IN A MOTOR-CYCLE PROVIDED WITH FLUID COUPLING

[76] Inventors: Masayuki Kudo, 3-16-13, Saiwai-Cho, Shiki-Shi, Saitama-Ken; Nobuo Miura, 915, Shimo-Niikura, Wako-Shi, Saitama-Ken; Shigetaka Hada, 29-47, Hon-Machi, Wako-Shi, Saitama-Ken, all of Japan

[21] Appl. No.: 844,893

[22] Filed: Oct. 25, 1977

[30] Foreign Application Priority Data

Oct. 29, 1976 [JP] Japan .......................... 51-146758[U]

[51] Int. Cl.[2] .......................... B60K 41/18; F02P 5/04; H05B 41/392

[52] U.S. Cl. ................................ 74/860; 123/117 R; 123/148 E; 315/209 R

[58] Field of Search ................. 74/857, 858, 859, 860; 123/117 R, 148 E; 315/209 SC, 209 R, 209 CD

[56] References Cited

U.S. PATENT DOCUMENTS

| | | | |
|---|---|---|---|
| 3,556,064 | 1/1971 | Date et al. | 74/860 X |
| 3,626,455 | 12/1971 | Toda et al. | 74/860 |
| 3,643,526 | 2/1972 | Thornburgh | 74/860 |
| 3,707,892 | 1/1973 | Kuroda et al. | 74/860 X |
| 3,792,630 | 2/1974 | Hause | 74/860 |
| 3,946,708 | 3/1976 | Saita | 123/117 R |
| 4,034,731 | 7/1977 | Sato | 123/148 E |

*Primary Examiner*—C. J. Husar
*Assistant Examiner*—Lance W. Chandler
*Attorney, Agent, or Firm*—Polster, Polster and Lucchesi

[57] ABSTRACT

Proposed in this application is a device for adjusting ignition timing in an engine for a motor-cycle having an engine, an ignition circuit for the engine, a fluid coupling connected to the engine, a power transmission mechanism which receives driving force from the fluid coupling, and shift indicating switch which changes over in association with the power transmission mechanism to indicate a low speed drive, a high speed drive, or the neutral position, wherein the ignition timing adjusting device comprises: a plurality of ignition signal emitters, each having differing signal emission timing and producing an ignition signal output to actuate said ignition circuit when the engine is in a driven state and the vehicle is in a stopped state; and a switching element which, in accordance with change-over operation of the shift indicating switch device, controls in such a manner that any one of the output signals from the plurality of ignition signal emitters may be fed as an input into the ignition circuit.

1 Claim, 3 Drawing Figures

DEVICE FOR ADJUSTING IGNITION TIMING IN A MOTOR-CYCLE PROVIDED WITH FLUID COUPLING

BACKGROUND OF THE INVENTION

This invention relates to motor-cycle in general, and, more particularly, it is concerned with a device for adjusting ignition timing in a motor-cycle provided with fluid coupling.

There has already been known a motor-cycle having a fluid coupling interposed between a motor-cycle engine and its power transmission with a view to attaining smooth transmission of the driving force from the engine.

The above-mentioned power transmission mechanism is in such a construction that it has at least two-stage speed changing function of a low speed drive and a high speed drive, and that shifting between the low speed drive and the high speed drive is indicated by a shift indicating mechanism which is in an interlocked relationship with the shifting mechanism.

In the above-described construction of the motor-cycle, work load imposed on the engine is greater when the engine is subjected to the idle running with the shift mechanism being shifted to the neutral position than when it is subjected to the idle running with the shift mechanism being shifted to either a low speed drive range or a high speed drive range. The term "idle running" as used herein is meant by that, while the engine is running, its driving force is not yet transmitted to the vehicle drive shaft but is idling at the portion of the fluid coupling, and the vehicle is not yet driven to run.

On account of this, there has so far occurred inconvenience such that, unless the power shift mechanism is shifted to the neutral position when the vehicle is stopped temporarily at a crossing, etc., the engine is inevitably stopped.

SUMMARY OF THE INVENTION

In view of the above-mentioned disadvantage inherent in the known types of power transmission, it is the primary object of the present invention to provide an ignition timing adjusting device in a motor-cycle provided with fluid coupling which, when the shift mechanism is shifted to a low speed drive range (or a high speed drive range), or the neutral position, adjusts the ignition timing of the engine in accordance with the corresponding shift position, thereby properly maintaining the engine in its idle running state.

According to the present invention, generally speaking, there is provided a device for adjusting ignition timing in a motor-cycle provided with fluid coupling which comprises an engine, an ignition circuit for said engine, a fluid coupling connected to said engine, a power transmission mechanism which receives driving force from the fluid coupling, and shift indicating switch means which changes over in association with the power transmission mechanism to indicate a low speed drive, a high speed drive, or the neutral position, a plurality of ignition signal emitters, each having differing signal emission timing and producing an ignition signal output to actuate the ignition circuit when the engine is in a driven state and the vehicle is in a stopped state, and a switching element which, in accordance with change-over operation of the shift indicating switch means, controls in such a manner that any one of the output signals from the plurality of ignition signal emitters may be fed as an input into the ignition circuit.

There has thus been outlined rather broadly the more important features of the present invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as far as they do not depart from the spirit and scope of the invention.

BRIEF DESCRIPTION OF THE ACCOMPANYING DRAWINGS

Specific embodiment of the present invention has been chosen for the purposes of illustration and description, and is shown in the accompanying drawings, forming a part of the specification, wherein.

DETAILED DESCRIPTION OF PREFERRED EMBODIMENT

In the following, the present invention will be particularly described in reference to a preferred embodiment thereof as illustrated in the accompanying drawing.

Figure 1:
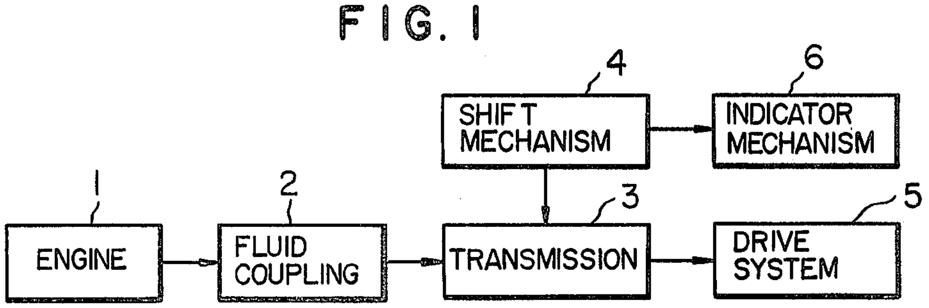
FIG. 1 is a block diagram showing an interlocking relationship between the sequence of transmitting driving force from the engine and the shift indicating mechanism.

FIG. 1 shows an interlocking relationship between the sequence of transmitting driving force and the shift mechanism, in which the driving force from an engine 1 is transmitted to the power transmission mechanism 3 through a fluid coupling 2 and is then further transmitted to a wheel driving system 5 by shifting of a shift mechanism 4. On the other hand, a shift indicating mechanism 6 (inclusive of an electrical circuit therefor) is actuated in association with the shifting of the above-mentioned shifting mechanism 4 to indicate a condition as shifted.

Figure 2:
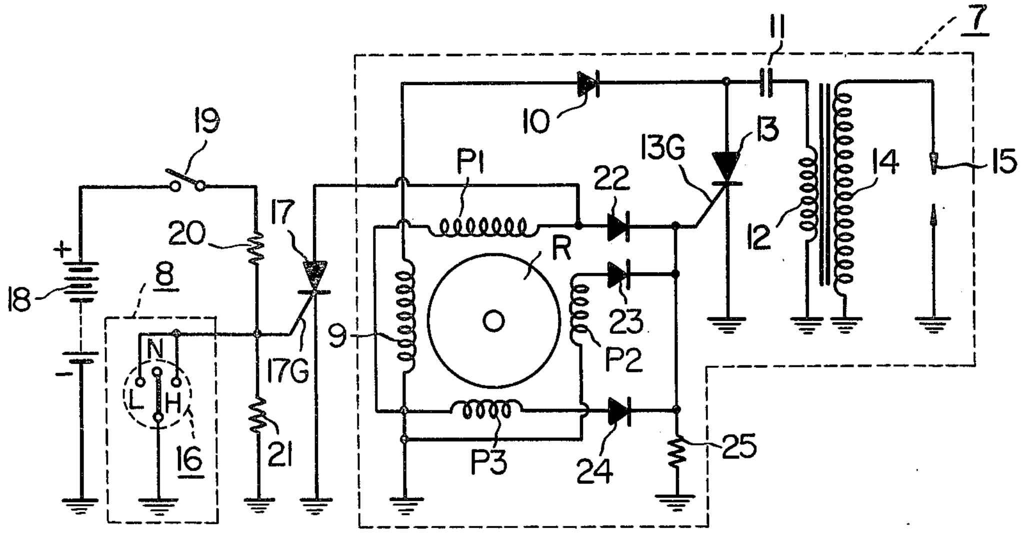
FIG. 2 is an electrical circuit diagram of the ignition timing adjusting device according to the present invention.

FIG. 2 is a connection diagram between the ignition circuit 7 of the above-mentioned engine and the shift indicating switch circuit 8.

The ignition circuit 7 adopts a capacitive discharge ignition system, at the primary side of which there are provided an electric power generating coil 9 which generates electricity by the rotation of the rotor R of the alternating current electric power generator, a diode 10, a capacitor 11, a primary ignition coil 12, and switching means 13 which connects and disconnects the primary side (in the illustrated embodiment, a thyrister is used), and at the secondary side of which there are provided a secondary ignition coil 14 and ignition plugs 15.

First to third ignition signal emitters P1 through P3 are to produce output signals by the rotation of the rotor R of the alternating current electric power generator, the output signal of which is forwarded to the gate 13G of the thyrister 13 to control the thyrister 13 for its connection and disconnection. The abovementioned first and second ignition signal emitters P1 and P2 are used in the idle running state of the engine. As will be described hereinafter, the first ignition signal emitter P1 forwards its output signal to the gate 13G of the thyrister, when the shift mechanism is shifted to the low speed drive range or the high speed drive range, while the second ignition signal emitter P2 sends its output signal to the gate 13G of the thyrister 13, when the shift mechanism is shifted to the neutral position. Further, the third ignition signal emitter P3 is to forward its output signal to the gate 13G of the thyrister 13 when the shift mechanism is shifted to the low speed drive range or high speed drive range and the vehicle is thereby in the state of running. Accordingly, the first ignition signal emitter P1 is advanced from the second ignition signal emitter P2. Also, the third ignition signal emitter P3 is, at the time of the vehicle running, advanced from the first ignition signal emitter P1.

The shift indicating switch circuit 8 has a switch 16 interlocked with shifting or the shift mechanism to be changed over to the low speed drive range L, high speed drive range H, or the neutral position N. Although omitted from showing, there are provided lamps which indicate each speed drive range in the shift indicating switch circuit. The thyrister 17 is provided in parallel with the first ignition signal emitter P1, to the gate 17G of which there is connected the above-mentioned shift indicating switch circuit, by the change-over of which the thyrister 17 is controlled for its connection and disconnection.

A reference numeral 18 designates a power source, 19 refers to a main switch, 20 and 21 refer to voltage dividing resistors, 22, 23, and 24 refer to diodes, and 25 denotes a resistor.

Now assume that the vehicle is temporarily stopped after running for a certain distance by closure of the main switch 19, in which the switch 16 in the shift indicating switch circuit 8 has been changed over to the neutral position as shown in the drawing. In this case, the gate 17G of the thyrister 17 receives a voltage at the point A, which voltage is resulted from dividing a voltage of the power source 18 by the resistors 20 and 21, whereby the thyrister 17 becomes conductive and the first ignition signal emitter P1 is short-circuited. On account of this, the thyrister 13 in the ignition circuit 7 is controlled by an output from the second ignition signal emitter P2, and the engine 1 is maintained in an appropriate idle running condition.

In case the switch 16 of the shift indicating circuit 8 has been changed over to the low speed drive range L or the high speed drive range H, the resistor 21 is short-circuited by the switch 16. On account of this, the point A is at the ground potential and the thyrister 17 is in a non-conductive state, while the thyrister 13 in the ignition circuit 7 is controlled by an output from the first ignition signal emitter P1, so that the engine 1 is maintained in the appropriate idle running condition.

In the above-mentioned state, when the accelerator is operated to increase the number of revolution of the engine, the ignition circuit 7 is controlled by the third ignition signal emitter P3, whereby the number of revolution of the engine suited for the vehicle cruising can be secured.

Figure 3:
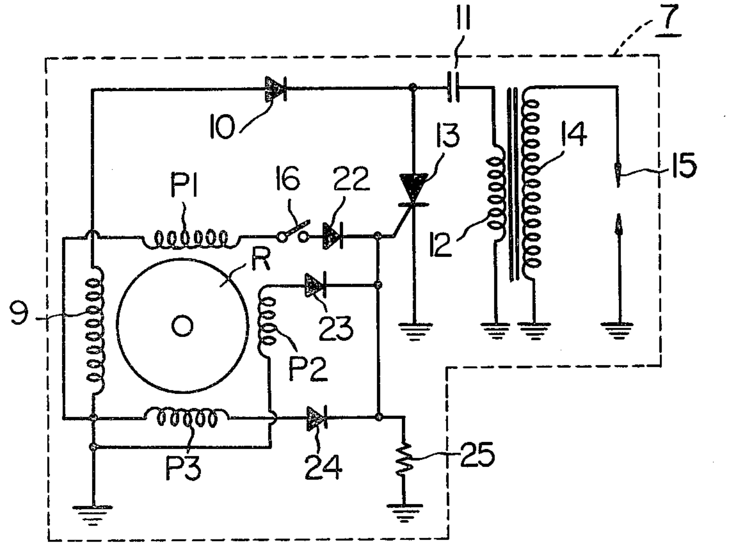
FIG. 3 is a modified embodiment of the electrical circuit diagram of the ignition timing adjusting device according to the present invention.

FIG. 3 shows an example, in which the shift indicating switch 16 is provided in series with the first ignition signal emitter P1 so as to simplify the circuit construction. In this illustration, the same parts as in FIG. 2 are designated by the same reference symbols.

From what has been mentioned in the foregoing, the present invention is capable of controlling the ignition circuit by the ignition signal emitter which is suitable for the load condition imposed on the engine according to the shifting of the transmission mechanism, even if the transmission mechanism has been changed over to the low speed drive range, or the high speed drive range, or the neutral position by the shift mechanism in the idle running condition of the engine as mentioned in the foregoing, so that any inconvenience such that the engine is stopped by variation in the load to be imposed on the engine can be eliminated. Incidentally, it is also feasible to use, in place of the thyrister 17, a mechanical switch or a semiconductive element such as transistor, etc. Moreover, the speed changing function of the power transmission mechanism according to the present invention may possibly be a single stage in some case.

What is claimed is:

1. In a device for adjusting ignition timing for an engine mounted on a motor-cycle which includes an engine; an ignition circuit having at the primary side thereof a thyrister as a switching means, a diode, a capacitor, a primary ignition winding and a rotor of a.c. electric power generator, and at the secondary side thereof a secondary ignition coil and ignition plugs; a fluid coupling connected to said engine; a power transmission mechanism which receives driving force from said fluid coupling and has at least two-stage speed changing function of a low speed drive and a high speed drive; and shift indicating switch means which changes over in association with shifting of said power transmission mechanism to indicate the shift position of the low speed drive, the high speed drive, or the neutral position, the improvement comprising first, second and third ignition signal emitters in said ignition circuit arranged in parallel relative to the gate of said thyrister and to produce output signals by rotation of said rotor of said a.c. electric power generator, the output signal being forwarded to the gate of said thyrister to connect and disconnect the same, said first ignition signal emitter forwarding its output signal to the gate of said thyrister when the shift mechanism is shifted to the low speed drive range or high speed drive range, said second ignition signal emitter forwarding its output signal to the gate of said thyrister when the shift mechanism is shifted to the neutral position, and said third ignition signal emitter forwarding its output signal to the gate of said thyrister when the shift mechanism is shifted to the low speed drive range or high speed drive range and the motor-cycle is in the state of running, said first ignition signal emitter being advanced from said second ignition signal emitter, and said third ignition signal emitter being advanced from said first ignition signal emitter when the motor-cycle is running; and another thyrister for short-circuiting said ignition signal emitters, which is provided in parallel with said first ignition signal emitter, the gate of said thyrister being connected to said shift indicating switch means, and said thyrister being made conductive when said shift indicating switch means has been changed over to the neutral position so that the advanced signal emitter may be short-circuited.

* * * * *

UNITED STATES PATENT AND TRADEMARK OFFICE

CERTIFICATE OF CORRECTION

PATENT NO. : 4,164,157

DATED : August 14, 1979

INVENTOR(S) : Masayuki Kudo et al

It is certified that error appears in the above-identified patent and that said Letters Patent are hereby corrected as shown below:

Assignee: Honda Giken Kogyo Kabushiki Kaisha
27-8, Jingumae 6-Chome
Shibuya-Ku, Tokyo-To, Japan

Signed and Sealed this

***Twenty-fifth* Day of *December 1979***

[SEAL]

*Attest:*

SIDNEY A. DIAMOND

*Attesting Officer* *Commissioner of Patents and Trademarks*